(12) United States Patent
Kammath et al.

(10) Patent No.: US 11,429,361 B2
(45) Date of Patent: Aug. 30, 2022

(54) AGENTS INSTALLATION IN DATA CENTERS BASED ON HOST COMPUTING SYSTEMS LOAD

(71) Applicant: VMWARE, INC., Palo Alto, CA (US)

(72) Inventors: V Vimal Das Kammath, Bangalore (IN); Zacharia George, Bangalore (IN); Narendra Madanapalli, Bangalore (IN); Rahav Vembuli, Bangalore (IN); Aditya Sushilendra Kolhar, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 548 days.

(21) Appl. No.: 16/424,547

(22) Filed: May 29, 2019

(65) Prior Publication Data

US 2020/0225926 A1    Jul. 16, 2020

(30) Foreign Application Priority Data

Jan. 10, 2019   (IN) .............................. 201941001199

(51) Int. Cl.
G06F 9/455   (2018.01)
G06F 8/61    (2018.01)
G06F 9/50    (2006.01)

(52) U.S. Cl.
CPC ............ G06F 8/61 (2013.01); G06F 9/45533 (2013.01); G06F 9/505 (2013.01); G06F 9/5044 (2013.01); G06F 2209/508 (2013.01)

(58) Field of Classification Search
CPC ...... G06F 8/61; G06F 9/45533; G06F 9/5044; G06F 9/505
See application file for complete search history.

(56) References Cited

U.S. PATENT DOCUMENTS

| | | | | |
|---|---|---|---|---|
| 8,266,616 | B1* | 9/2012 | Jacquot | G06F 8/65 717/177 |
| 2005/0223378 | A1* | 10/2005 | Musa | G06F 9/4843 718/100 |
| 2009/0150878 | A1* | 6/2009 | Pathak | G06F 8/65 717/172 |
| 2019/0236150 | A1* | 8/2019 | Zaslavsky | G06F 9/45558 |

* cited by examiner

Primary Examiner — Tammy E Lee

(57) ABSTRACT

Techniques for installing agents on host computing systems in data centers are disclosed. In one example, load information and resource capability associated with a host computing system in a data center may be determined. Further, a maximum number of concurrent installations to be performed on the host computing system may be determined based on the load information and the resource capability. Furthermore, a channel with the maximum number of concurrent installations may be configured for the host computing system and agents may be installed on the host computing system based on the configured channel.

26 Claims, 5 Drawing Sheets

US 11,429,361 B2

AGENTS INSTALLATION IN DATA CENTERS BASED ON HOST COMPUTING SYSTEMS LOAD

RELATED APPLICATIONS

Benefit is claimed under 35 U.S.C. 119(a)-(d) to Foreign Application Serial No. 201941001199 filed in India entitled "AGENTS INSTALLATION IN DATA CENTERS BASED ON HOST COMPUTING SYSTEMS LOAD", on Jan. 10, 2019, by VMWARE, INC., which is herein incorporated in its entirety by reference for all purposes.

TECHNICAL FIELD

The present disclosure relates to computing environments, and more particularly to methods, techniques, and systems for installing agents in data centers based on host computing systems load.

BACKGROUND

In computing environments, a host computing system may execute workloads running herein. Example host computing system may be a physical computer and example workloads may include virtual machines and/or containers. A virtual machine can be a software implementation of the physical computer that runs an operating system (OS) and virtual machine applications. The container may be an instance of a user-space running containerized applications within the OS of the virtual machine. Further, the host computing system and/or the workloads may execute various applications. Monitoring and/or managing such applications and corresponding OS performance may include deploying or installing various agents such as monitoring agents, security agents, and the like on the host computing system and/or on the workloads running on the host computing system. For example, agents deployed on a virtual machine may monitor and manage the OS and applications deployed on that virtual machine.

Figure 1A:
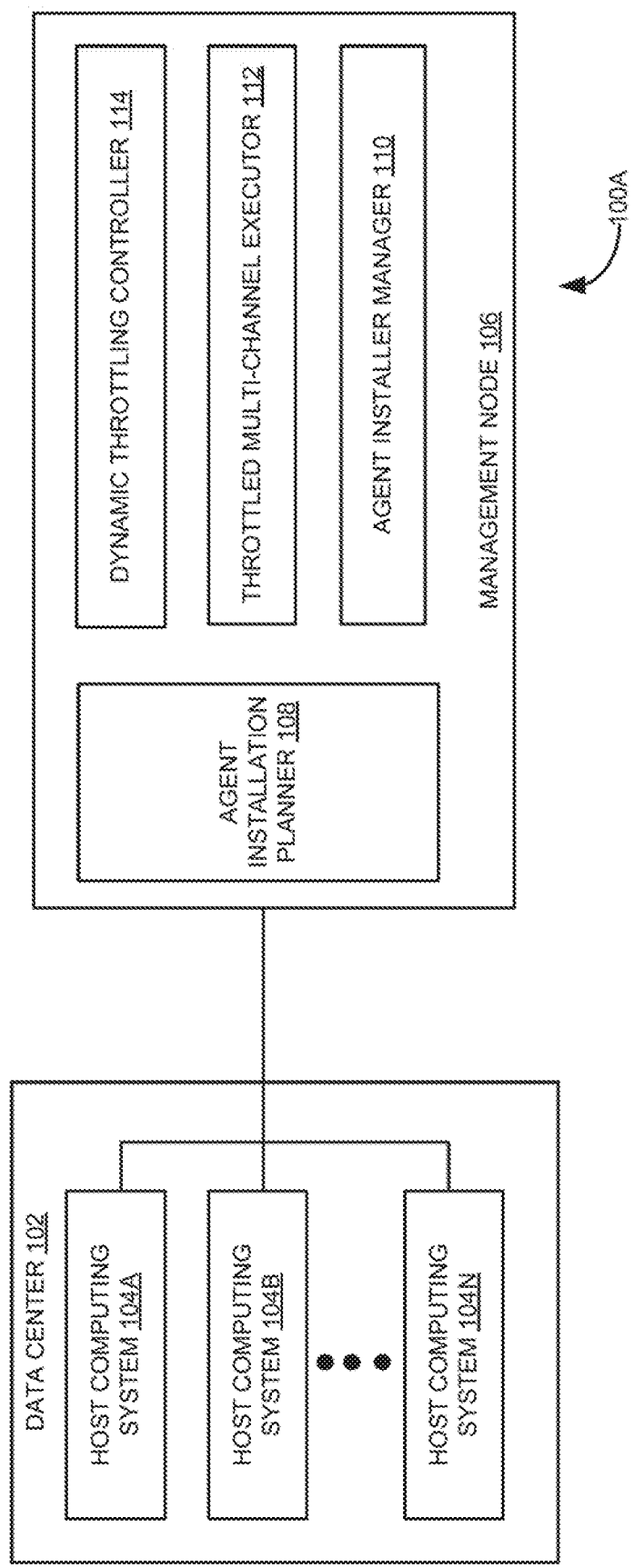
FIG. 1A is a block diagram of an example system, including a management node to install multiple agents on each host computing system based on a corresponding maximum number of concurrent installations that can be performed.

The drawings described herein are for illustration purposes only and are not intended to limit the scope of the present subject matter in any way.

DETAILED DESCRIPTION

Examples described herein may provide an enhanced computer-based and network-based method, technique, and system for installing agents in data centers based on host computing systems load. A data center may be a physical data center (e.g. an on-premise computing environment) and/or virtual data center (e.g., a cloud computing environment, a virtualized environment, and the like). The virtual data center may be a pool or collection of cloud infrastructure resources designed for enterprise needs. The resources may be a processor (e.g., central processing unit (CPU)), memory (e.g., random-access memory (RAM)), storage (e.g., disk space), and networking (e.g., bandwidth). Further, the virtual data center may be a virtual representation of a physical data center, complete with servers, storage clusters, and networking components, all of which may reside in virtual space being hosted by one or more physical data centers.

Further, the data center may include a plurality of host computing systems executing a plurality of workloads. Example host computing system may be a physical computer and example workload may be an application, a virtual machine, a container, and/or the like. The host computing systems and/or the corresponding workloads may execute various applications. To monitor and manage such applications and corresponding operating system (OS), various agents such as monitoring agents, security agents, and the like may be deployed or installed on the host computing systems and/or the workloads. For example, a monitoring agent may be installed on the host computing system to track application processes (e.g., network connections, system calls, and the like) to rectify abnormalities or shortcomings, if any. In another example, agents deployed on a virtual machine may monitor and manage OS and applications deployed on that virtual machine. However, installing the agents on a significantly large number (e.g., several thousands of machines running applications that need to be monitored) of the host computing systems and/or the workloads running on the host computing systems may be challenging.

Some methods for installing the agents may include sequential installation approach. In the sequential installation, an agent installation coordinator may install an agent on one workload (e.g., a virtual machine) running on a host computing system at a time. When installation is completed, the agent installation coordinator may begin installing the agent on the next workload running on the host computing system. However, sequential installation may be time consuming. Some other methods to install the agents may include running agent installation in parallel on all workloads running on host computing systems in the data center. However, parallel installation may cause a resource crunch that may slow down the corresponding host computing system. Thereby, parallel installation may have a negative effect on the overall agent installation duration. The amount of negative effect may depend on the amount of resources available on the physical host computing system and how many virtual machines are sharing those resources.

Examples described herein may perform installation of agents by leveraging both sequential installation approach and parallel installation approach by breaking down agent installation tasks across multiple virtual machines and handling multiple installation tasks in parallel. Examples described herein may consider load information and resource capability of host computing systems to determine a maximum number of concurrent installations to be performed on each of the host computing systems. Further, examples described herein may configure a channel with the maximum number of concurrent installations for each of the host computing systems and perform installation of agents on the host computing systems based on the corresponding configured channels. In one example, performing installation of agents on the host computing systems may include performing installation of agents on virtual machines running on the host computing systems based on the configured channel associated with each host computing system. Thus, examples described herein may perform agent installation in parallel without affecting existing applications or workloads running on the host computing systems.

Thus, examples described herein may be used to control concurrent agent installations across multiple virtual machines running on the host computing systems, where the concurrent agent installation is carried out on a set of virtual machines at a time instead of concurrently installing agent on all the virtual machines at the same time. In this example, the concurrent target virtual machines may be selected proportionately from available host computing systems such that a higher number of concurrent target virtual machines may be selected from the host computing systems having higher spare/available resources.

System Overview and Examples of Operation

FIG. 1A is a block diagram of an example system 100A including a management node 106 to install multiple agents (e.g., distinct agents) on each of host computing systems 104A-104N based on a corresponding maximum number of concurrent installations that can be performed. System 100A may include a data center 102, which may be a physical data center and/or a virtual data center. In system 100A, data center 102 may be a physical data center including a plurality of host computing systems 104A-104N, each executing corresponding ones of various applications. Example host computing systems 104A-104N may be physical computers. Example physical computer may be a hardware-based device (e.g., a personal computer, a laptop, or the like) including an operating system (OS) and executing the applications. An application, also referred to as an application program or application software, may be a computer software package that performs a specific function directly for an end user or, in some cases, for another application. Examples of applications may include word processors, database programs, web browsers, development tools, image editors, communication platforms, and the like.

As shown in FIG. 1A, system 100A may include management node 106 communicatively coupled to host computing systems 104A to 104N via a network, for instance. Example network can be a managed Internet protocol (IP) network administered by a service provider. For example, the network may be implemented using wireless protocols and technologies, such as Wi-Fi, WiMAX, and the like. In other examples, the network can also be a packet-switched network such as a local area network, wide area network, metropolitan area network, Internet network, or other similar type of network environment. In yet other examples, the network may be a fixed wireless network, a wireless local area network (WLAN), a wireless wide area network (WWAN), a personal area network (PAN), a virtual private network (VPN), intranet or other suitable network system and includes equipment for receiving and transmitting signals.

Further, management node 106 may include an agent installation planner 108 to determine the maximum number of concurrent installations to be performed on each of host computing systems 104A-104N. In one example, agent installation planner 108 may determine the maximum number of concurrent installations corresponding to each of host computing systems 104A-104N based on resource capability and load information associated with each of host computing systems 104A-104N. Example resource capability may include a processing resource capability, memory resource capability, storage resource capability, networking resource capability, and/or the like associated with each of host computing systems 104A-104N. Example load information associated with each of host computing systems 104A-104N may include a number of applications running on corresponding host computing systems 104A-104N and associated resource utilizations (e.g., processing resource utilization, memory resource utilization, storage resource utilization, and/or networking resource utilization).

In one example, agent installation planner 108 may consider a total number of concurrent installations that can be performed in data center 102 to determine the maximum number of concurrent installations corresponding to each of host computing systems 104A-104N. For example, the total number of concurrent installations may be determined based on load information and resource capability associated with a computing system/virtual machine on which management node 106 is running therein. In one example, the maximum number of concurrent installations associated with host computing systems 104A-104N may be less than or equal to the total number of concurrent installations. The computing system may run computing system's primary workloads as well as management node 106 that shares resources with the primary workloads. Thus, management node 106 that consume resources during installation of the agents may be considered to determine the total number of concurrent installations.

Further, agent installation planner 108 may configure a channel with the determined maximum number of concurrent installations for each of host computing systems 104A-104N. In one example, agent installation planner 108 may set the maximum number of concurrent installations to be performed corresponding to each channel on each of host computing systems 104A-104N. Furthermore, management node 106 may include an agent installer manager 110 to perform installation of agents on each of host computing systems 104A-104N based on the corresponding configured channels.

As shown in FIG. 1A, management node 106 may include a throttled multi-channel executor 112 to manage installation of the agents that is partitioned into distinct channels. In one example, throttled multi-channel executor 112 may dynamically create a number of threads across all the configured channels in data center 102 based on the total number of concurrent installations that can be performed in data center 102 and manage the installation of the agents on host computing systems 104A-104N based on the created number of threads. In one example, throttled multi-channel executor 112 may enable the threads to select an installation of the agents on a host computing system (e.g., 104A) based on the maximum number of concurrent installations to be performed corresponding to host computing system (e.g., 104A). For example, agents may refer to multiple distinct applications that need to be installed on each of host computing systems 104A-104N. In this example, the agents that need to be installed on host computing system 104A may be distinct from each other. In other words, each of the agents may perform a different function/operation.

During operation, agent installer manager 110 may perform installation of the agents on each of host computing systems 104A-104N based on the maximum number of concurrent installations corresponding to the channels. In one example, agent installer manager 110 may perform the installation of a first set of agents on the host computing system (e.g., 104A) in parallel based on the maximum number of concurrent installations associated with the host computing system (e.g., 104A). The first set may correspond to the maximum number of concurrent installations associated with the host computing system (e.g., 104A). Further, agent installer manager 110 may repeat the step of performing the installation for a next set of agents on the host computing system (e.g., 104A), either individually or in a group, until installation of the agents on the host computing system (e.g., 104A) is completed. In this example, when any thread is free, the thread can pick up any available job as long as the number of concurrent executions on the channel does not exceed the maximum number of concurrent installations of the channel. Similarly, agent installer manager 110 may perform installation of the agents on other host computing systems 104B-104N and this process of installation can be carried out in parallel between host computing systems 104N-104N. Furthermore, throttled multi-channel executor 112 may manage installation of the agents on each of host computing systems 104A-104N by throttling agent installation requests based on the corresponding maximum number of concurrent installations.

As shown in FIG. 1A, management node 106 may further include a dynamic throttling controller 114 to monitor real-time load information associated with each of host computing systems 104A-104N. Further, dynamic throttling controller 114 may dynamically throttle the maximum number of concurrent installations based on the real-time monitored load information. Thus, when multiple agents have to be installed on host computing system (e.g., 104A), that can be running some critical workloads that ought not to be perturbed, examples described herein may minimize perturbation, which amounts to ordering the agents installations in such a way as to minimize traffic on the network (e.g., both workload traffic and agent installation related network traffic) and thereby minimize bursts on host computing system (e.g., 104A).

Figure 1B:
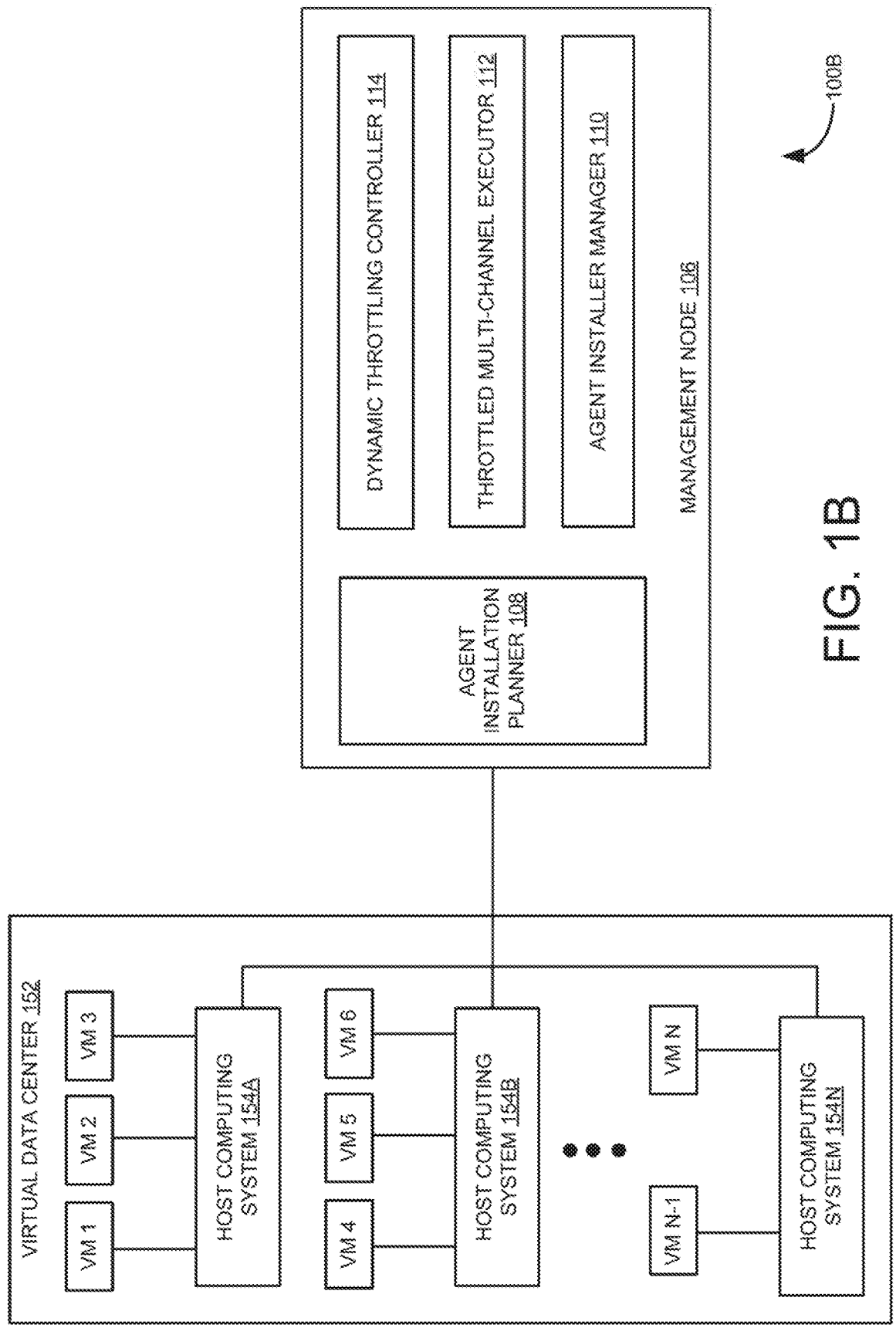
FIG. 1B is a block diagram of another example system, including the management node of FIG. 1A to manage installation of the agents on workloads running on the host computing systems.

FIG. 1B is a block diagram of another example system 100B including management node 106 to manage installation of the agents on workloads (e.g., virtual machines VM 1 to VM N) running on host computing systems 154A-154N. For example, similarly named elements of FIG. 1B may be similar in structure and/or function to elements described with respect to FIG. 1A. As shown in FIG. 1B, system 100B may include a virtual data center 152. In system 100B, example virtual data center 152 may include plurality of host computing systems 154A-154N, each executing corresponding ones of workloads. Example host computing systems 154A-154N may be physical computers (e.g., VMware® ESXi). Example workloads may be containers and/or virtual machines (e.g., VM 1 to VM N). For example, a virtual machine (e.g., VM 1) may operate with its own guest operating system on a corresponding host computing system (e.g., 154A) using resources of host computing system 154A virtualized by virtualization software (e.g., a hypervisor, a virtual machine monitor, and the like). In another example, a container may be a data computer node that runs on top of a host operating system without the need for a hypervisor or separate operating system.

In one example, host computing systems 154A-154N may support applications executed by the workloads VM 1 to VM N. Examples of applications may include word processors, database programs, web browsers, development tools, image editors, communication platforms, and the like. In one example, the applications may use a host computing system's (e.g.,154A-154N) operating system and other supporting programs, such as system software, to function. The system software may manage operation of host computing system (e.g.,154A-154N) and may include the operating system, a hypervisor, and drivers, and/or the like.

Further, agent installation planner 108 may determine a maximum number of concurrent installations to be performed on each of host computing systems 154A-154N. In one example, agent installation planner 108 may determine the maximum number of concurrent installations to be performed on each of host computing systems 154A-154N based on resource capability of each of host computing systems 154A-154N and a number of workloads running on each of host computing systems 154A-154N.

In one example, agent installation planner 108 may retrieve workload details from an inventory list of virtual data center 152. In one example, the inventory list may include data of workloads VM 1 to VM N within virtual data center 152, including a dynamic list of computing resources that relate to workloads VM 1 to VM N. Further, agent installation planner 108 may group workloads VM 1 to VM N based on host computing systems 154A-154N that executes workloads VM 1 to VM N such that each group of workloads corresponds to one host computing system. Furthermore, agent installation planner 108 may determine the number of workloads VM 1 to VM N (i.e., load information) running on each of host computing systems 154A-154N based on the grouping of workloads VM 1 to VM N. Also, agent installation planner 108 may configure a channel for each of host computing systems 154A-154N and set the maximum number of concurrent installations to be performed corresponding to each channel. Thus, agent installation planner 108 may enumerate the inventory list and creates agent installation jobs that would be executed in a concurrent manner based on configured channels for each of host computing systems 154A-154N.

Further, agent installer manager 110 may perform installation of agents on workloads VM 1 to VM N based on the configured channel associated with each of host computing systems 154A-154N. In this example, the same agent may need to be installed on each of workloads VM 1 to VM N. Furthermore, throttled multi-channel executor 112 of management node 106 may manage installation of the agents that is partitioned into distinct channels. In one example, throttled multi-channel executor 112 may dynamically create threads in data center 152 with a thread count equal to a total number of concurrent installations that can be performed in data center 152 and each thread may be to perform installation of an agent on one workload at a time. Further, throttled multi-channel executor 112 may enable the created threads to perform the installation of the agents in each channel based on the maximum number of concurrent installations to be performed corresponding to each channel. A sum of the maximum number of concurrent installations associated with host computing systems 154A-154N may be less than or equal to the total number of concurrent installations.

During operation, agent installer manager 110 may repeat the step of performing installation of the agents on workloads VM 1 to VM N based on the maximum number of concurrent installations associated with corresponding host computing systems 154A-154N until the agents are installed on all workloads VM 1 to VM N in virtual data center 152. In one example, the threads may concurrently perform installation of the agents on workloads VM 1 to VM N such that the number of concurrent installations in a particular channel does not exceed the maximum number of concurrent installations of that channel. Further, agent installer manager 110 may track installation of the agents on workloads VM 1 to VM N running on the host computing systems 154A-154N.

Further, throttled multi-channel executor 112 may manage installation of the agents on workloads VM 1 to VM N by throttling agent installation requests based on the maximum number of concurrent installations allowed for each of host computing systems 154A-154N and the total number of concurrent installations. Furthermore, dynamic throttling controller 114 may monitor real-time workload information associated with each of host computing systems 154A-154N and dynamically throttle the maximum number of concurrent installations based on the real-time monitored workload information and the total number of concurrent installations. Thus, management node 106 in the examples described herein may perform distributed installation job scheduling to concurrently execute jobs across multiple host computing systems 154A-154N (e.g., resource pool) while considering real-time feedback about the pool's resource usage to throttle the concurrency in each resource pool independent of other resource pools.

Examples described herein may facilitate agent installations using intelligent throttling of concurrent agent installations to achieve significantly faster agent install times compared to a sequential installation approach and a parallel installation approach. Even though FIGS. 1A and 1B describe about installation of agents, examples described herein may also be implemented for configuration, uninstallation, reinstallation, and the like of the agents.

Management node 106 can be a service process in the management application or can be an appliance running in the data center to cater multiple management applications in a cloud-based environment. For example, the management application may be VMware vSphere™, VCenter™, and the like that are offered by VMware. Management application can be provided in server, VM, or container.

In some examples, the functionalities described herein, in relation to instructions to implement functions of agent installation planner 108, agent installer manager 110, throttled multi-channel executor 112, dynamic throttling controller 114, and any additional instructions described herein in relation to the storage medium, may be implemented as engines or modules including any combination of hardware and programming to implement the functionalities of the modules or engines described herein. The functions of agent installation planner 108, agent installer manager 110, throttled multi-channel executor 112, and dynamic throttling controller 114 may also be implemented by a respective processor. In examples described herein, the processor may include, for example, one processor or multiple processors included in a single device or distributed across multiple devices.

The embodiments described also can be practiced without some of the specific details described herein, or with other specific details, such as changes with respect to the ordering of the logic, different logic, different architectures, or the like. Thus, the scope of the techniques and/or functions described is not limited by the particular order, selection, or decomposition of aspects described with reference to any particular routine, module, component, or the like.

Example Processes

Figure 2:
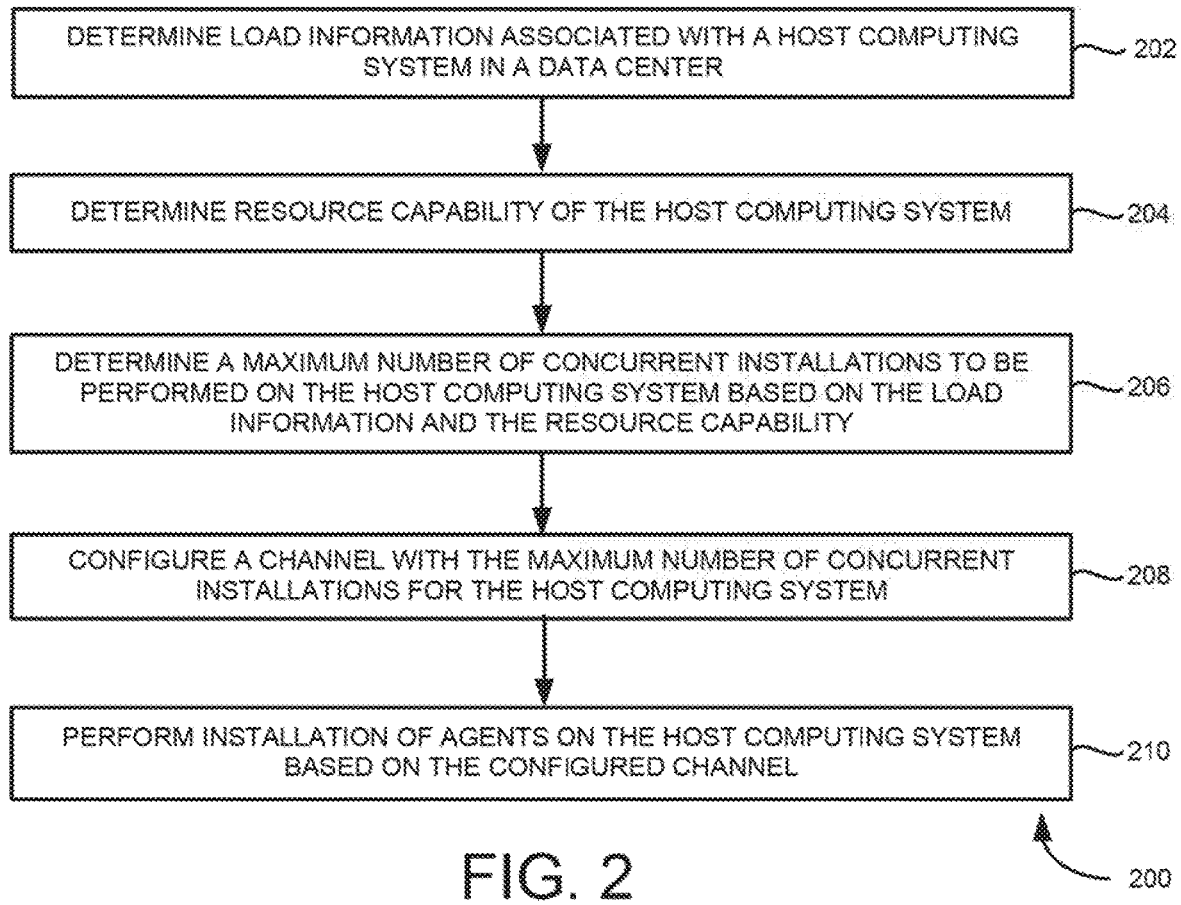
FIG. 2 is an example flow diagram of a method for performing installation of agents on a host computing system in a data center based on load information of the host computing system.

FIG. 2 is an example flow diagram 200 of a method for performing installation of agents on a host computing system in a data center based on load information of the host computing system. It should be understood that the process depicted in FIG. 2 represents generalized illustrations, and that other processes may be added, or existing processes may be removed, modified, or rearranged without departing from the scope and spirit of the present application. In addition, it should be understood that the processes may represent instructions stored on a computer-readable storage medium that, when executed, may cause a processor to respond, to perform actions, to change states, and/or to make decisions. Alternatively, the processes may represent functions and/or actions performed by functionally equivalent circuits like analog circuits, digital signal processing circuits, application specific integrated circuits (ASICs), or other hardware components associated with the system. Furthermore, the flow charts are not intended to limit the implementation of the present application, but rather the flow charts illustrate functional information to design/fabricate circuits, generate machine-readable instructions, or use a combination of hardware and machine-readable instructions to perform the illustrated processes.

At 202, load information associated with the host computing system in the data center may be determined. For example, consider there are two host computing systems (e.g., a first host computing system and a second host computing system) in the data center. Further, the first host computing system may be executing three virtual machines and the second host computing system may be executing four virtual machines. In the example, the load information of the first host computing system may include three virtual machines and the load information of the second host computing system may include four virtual machines and associated resource utilizations. The process for determining load information associated with the host computing system is described in FIG. 3.

At 204, resource capability of the host computing system may be determined. For example, resource capability of the first host computing system may include six processing units and 18 GB memory, and the second host computing system may include four processing units and 12 GB memory. At 206, a maximum number of concurrent installations to be performed on the host computing system may be determined based on the corresponding load information and the resource capability. Further, the maximum number of concurrent installations may depend on a predetermined total number of concurrent installations that can be performed in the data center. In the above example, consider the total number of concurrent installations that can be performed in the data center is 10. In this case, the maximum number of concurrent installations (e.g., 4) that can be performed on the first host computing system can be more than the maximum number of concurrent installations (e.g., 2) that can be performed on the second host computing system as the first host computing system may be comparatively less loaded than the second host computing system.

At 208, a channel with the maximum number of concurrent installations may be configured for the host computing system. In the example, a first channel with the maximum number of concurrent installations as 4 and a second channel with the maximum number of concurrent installations as 2 may be configured. Thus, the maximum number of concurrent installations may be set corresponding to each channel.

At 210, installation of agents may be performed on the host computing system based on the configured channel. In one example, performing the installation of the agents on the host computing system may include performing the installation of the agents to execute in the virtual machines running on the host computing system. In one example, the installation of the agents to execute in the virtual machines may be performed by:
   creating a number of threads corresponding to a total number of concurrent installations that can be performed in the data center, each thread may install an agent on one virtual machine at a time, and
   enabling the threads to perform the installation of the agents on the virtual machines in parallel based on the maximum number of concurrent installations for the host computing system.

In this example, enabling the threads to perform the installation of the agents on the virtual machines in parallel may include:
   enabling the threads to perform the installation of the agents on a first set of the virtual machines in parallel based on the maximum number of concurrent installations, the first set corresponds to the maximum number of concurrent installations associated with the channel, and
   repeating the step of performing the installation for a next set of the virtual machines on the host computing system until the agent is installed on all the virtual machines running on the host computing system. Similarly, installation of the agents on the virtual machines running on other host computing systems in the data center can be carried out in parallel based on a corresponding maximum number of concurrent installations and the total number of concurrent installations that can be performed in the data center.

In another example, the installation of the agents on the host computing system may be performed based on the configured channel by:
   creating a number of threads corresponding to a total number of concurrent installations that can be performed in the data center, each thread is to install an agent on the host computing system, and
   enabling the threads to perform the installation of the agents on the host computing system in parallel based on the maximum number of concurrent installations for the host computing system.

In this example, enabling the threads to perform the installation of the agents on the host computing system may include:
   enabling the threads to perform the installation of a first set of agents on the host computing system in parallel based on the maximum number of concurrent installations, the first set corresponds to the maximum number of concurrent installations associated with the channel, and
   repeating the step of performing the installation for a next set of agents until installation of the agents on the host computing system is completed. Each of the agents may perform a different function. Similarly, installation of the agents on each of the other host computing systems in the data center can be carried out in parallel based on a corresponding maximum number of concurrent installations and the total number of concurrent installations that can be performed in the data center.

Figure 3:
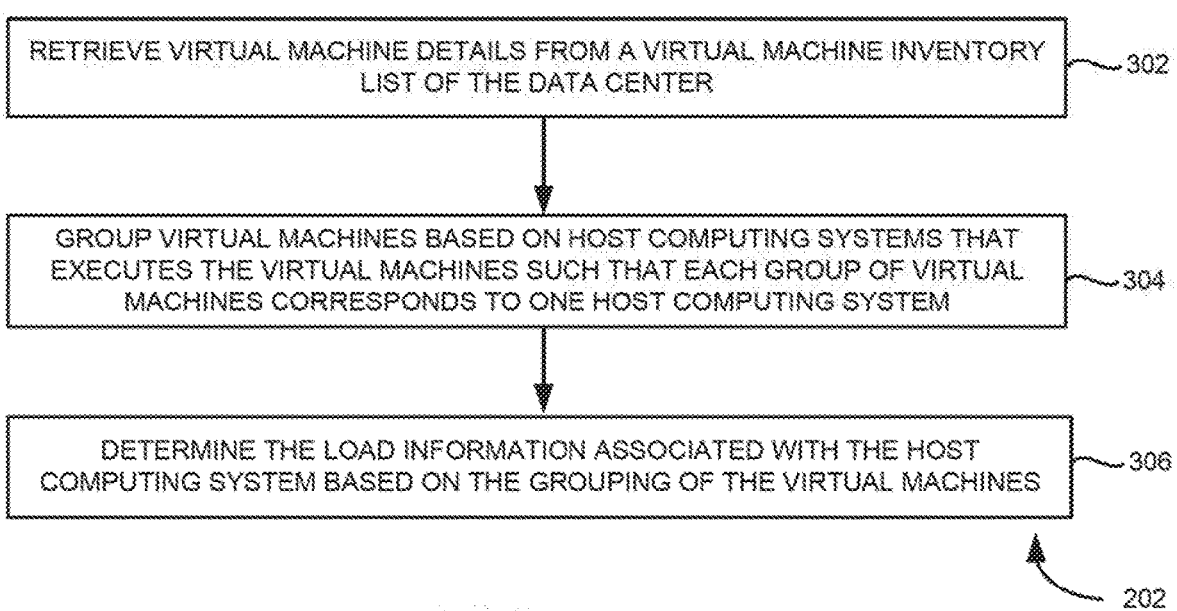
FIG. 3 is an example flow diagram of a method for determining the load information associated with the host computing system.

FIG. 3 is an example flow diagram 202 of a method for determining the load information associated with the host computing system. It should be understood that the process depicted in FIG. 3 represents generalized illustrations, and that other processes may be added, or existing processes may be removed, modified, or rearranged without departing from the scope and spirit of the present application. In addition, it should be understood that the processes may represent instructions stored on a computer-readable storage medium that, when executed, may cause a processor to respond, to perform actions, to change states, and/or to make decisions. Alternatively, the processes may represent functions and/or actions performed by functionally equivalent circuits like analog circuits, digital signal processing circuits, application specific integrated circuits (ASICs), or other hardware components associated with the system. Furthermore, the flow charts are not intended to limit the implementation of the present application, but rather the flow charts illustrate functional information to design/fabricate circuits, generate machine-readable instructions, or use a combination of hardware and machine-readable instructions to perform the illustrated processes.

At 302, virtual machine details may be retrieved from a virtual machine inventory list of a data center. For example, consider there are ten virtual machines in the data center. In one example, details of the ten virtual machines may be retrieved from the virtual machine inventory list. At 304, virtual machines may be grouped based on host computing systems that executes the virtual machines such that each group of virtual machines corresponds to one host computing system. In this example, five virtual machines may be grouped together as the five virtual machines are supported by a first host computing system, three virtual machines may be grouped together as the three virtual machines are supported by a second host computing system, and two virtual machines may be grouped together as the two virtual machines are supported by a third host computing system. At 306, the load information associated with the host computing system may be determined based on the grouping of the virtual machines. In the example, the first host computing system may be significantly loaded comparative to the second host computing system and the third host computing system. Thus, examples described herein may consider resource capability of the host computing system and a number of virtual machines sharing the resources for determining the load information associated with the host computing system.

Figure 4:
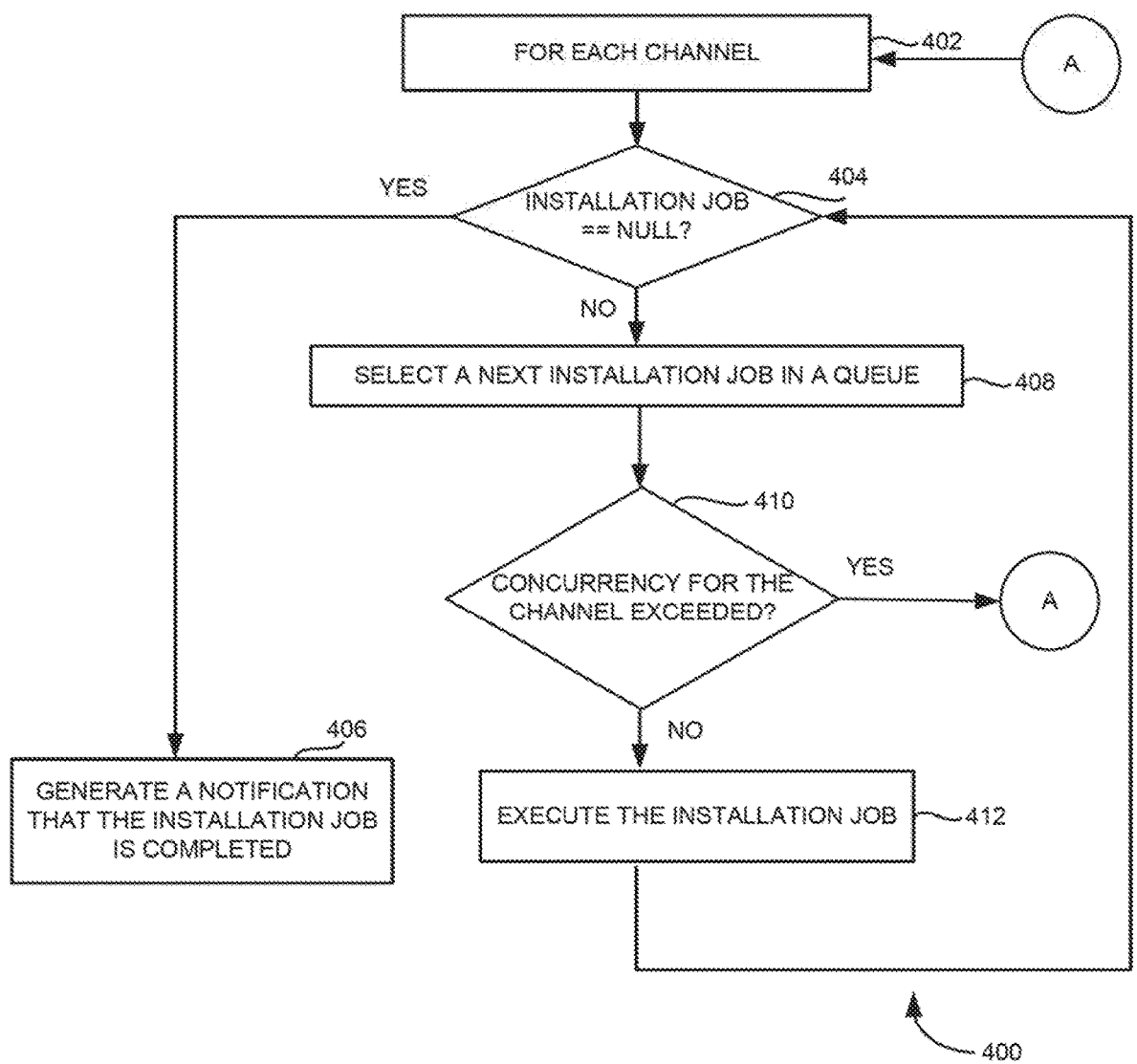
FIG. 4 is an example flow diagram of a method for enabling threads to perform installation of agents on workloads based on determined concurrency in each channel.

FIG. 4 is an example flow diagram 400 of a method for enabling a thread to perform installation of agents on the workloads based on determined concurrency in each channel. It should be understood that the process depicted in FIG. 4 represents generalized illustrations, and that other processes may be added, or existing processes may be removed, modified, or rearranged without departing from the scope and spirit of the present application. In addition, it should be understood that the processes may represent instructions stored on a computer-readable storage medium that, when executed, may cause a processor to respond, to perform actions, to change states, and/or to make decisions. Alternatively, the processes may represent functions and/or actions performed by functionally equivalent circuits like analog circuits, digital signal processing circuits, application specific integrated circuits (ASICs), or other hardware components associated with the system. Furthermore, the flow charts are not intended to limit the implementation of the present application, but rather the flow charts illustrate functional information to design/fabricate circuits, generate machine-readable instructions, or use a combination of hardware and machine-readable instructions to perform the illustrated processes.

In one example, a total number of threads across all channels in a data center may be created based on a total number of concurrent installations that can be performed in the data center. In one example, one thread may install an agent on one virtual machine at a time. Further, the created threads may be enabled to select the workloads in the data center to perform the installation of agents based on a maximum number of concurrent installations to be performed in a host computing system executing the workloads. Furthermore, the created threads may be shared freely to pick up available installation jobs as long as the number of concurrent executions on that channel does not exceed the concurrency threshold of the host corresponding to that channel.

At 402, each channel in the data center may be considered by a thread for installation of an agent. At 404, a check may be made to determine whether installation job is null in the host computing systems associated with the channels. At 406, a notification may be generated that the installation is completed when the installation job is null. For example, when the installation of agents is performed on all the virtual machines in the data center, the notification may be generated that the installation is completed.

When the installation job is not null, a next installation job in a queue may be selected, at 408. At 410, a check is made to determine whether the maximum number of concurrent installations of the channel associated with the installation job is exceeded. When the maximum number of concurrent installations is not exceeded, the installation job may be executed, at 412. However, when the maximum number of concurrent installations is exceeded, the process flow returns to 402, where process 400 may be repeated for the next channel in the data center.

Thus, examples described herein may create threads on-demand and may limit the thread count to the maximum number of concurrent installations. In one example, the threads may be shared freely to pick up available installation jobs as long as the number of concurrent executions on that channel does not exceed the concurrency threshold of the host corresponding to that channel.

Further, examples described herein may have the concurrent virtual machines chosen such that the chosen virtual machines may not be running on the same host computing system and are picked from available host computing systems. Thus, individual installations may complete significantly faster so that the threads become free to perform installation on another host computing system.

Examples described herein may manage the execution of agent installation jobs that may be partitioned into distinct channels (e.g., one channel per host computing system). Further, examples described herein may throttle installation requests such that there may be an upper limit placed on the total concurrency and the concurrency per host computing system.

Examples described herein may be implemented in management solutions (e.g., VMware®, Application Proxy™), where protecting target resources (i.e., host computing systems and workloads) from getting loaded/strained is necessary from the operations of a solution. For example, Application Proxy™ may install agents to collect application and operating system metrics for monitoring and troubleshooting. The monitoring and troubleshooting workflows are enabled from vRealize Operations Manager which includes the configuration of the Wavefront account as well as life cycle management of the agents on the Virtual Machines. In the scenario, examples described herein may be implemented to install the agents on the resources.

Figure 5:
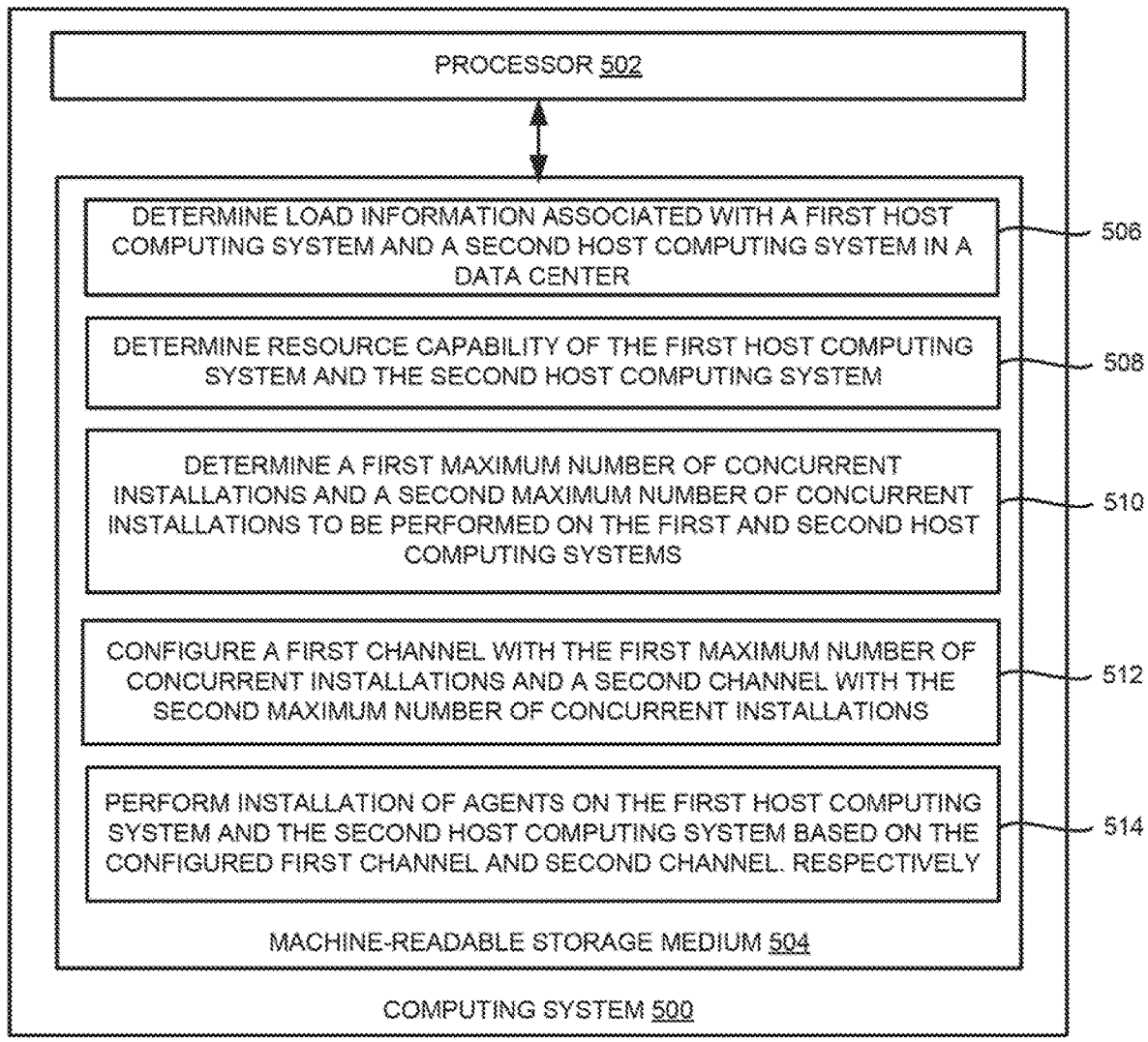
FIG. 5 is a block diagram of an example computing device including non-transitory computer-readable storage medium storing instructions to install multiple agents on each of first and second host computing systems.

FIG. 5 is a block diagram of an example computing system 500 including non-transitory computer-readable storage medium, storing instructions to install multiple agents on each of a plurality of host computing systems. Computing system 500 may include a processor 502 and a machine-readable storage medium 504 communicatively coupled through a system bus. Processor 502 may be any type of central processing unit (CPU), microprocessor, or processing logic that interprets and executes machine-readable instructions stored in machine-readable storage medium 504. Machine-readable storage medium 504 may be a random-access memory (RAM) or another type of dynamic storage device that may store information and machine-readable instructions that may be executed by processor 502. For example, machine-readable storage medium 504 may be synchronous DRAM (SDRAM), double data rate (DDR), Rambus® DRAM (RDRAM), Rambus® RAM, etc., or storage memory media such as a floppy disk, a hard disk, a CD-ROM, a DVD, a pen drive, and the like. In an example, machine-readable storage medium 504 may be a non-transitory machine-readable medium. In an example, machine-readable storage medium 504 may be remote but accessible to computing system 500.

Machine-readable storage medium 504 may store instructions 506-514. In an example, instructions 506-514 may be executed by processor 502 for installing agents on each of the plurality of host computing systems (e.g., a first host computing system and a second host computing system). Instructions 506 may be executed by processor 502 to determine load information associated with the first host computing system and the second host computing system in a data center. In one example, instructions to determine the load information may include instructions to retrieve virtual machine details from a virtual machine inventory list of the data center, group virtual machines in the retrieved virtual machine details based on the first host computing system and the second host computing system that executes the virtual machines such that a first group of virtual machines corresponds to the first host computing system and a second group of virtual machines corresponds to second host computing system, and determine the load information associated with the first host computing system and second host computing system based on the grouping of the virtual machines.

Instructions 508 may be executed by processor 502 to determine resource capability of the first host computing system and the second host computing system. Instructions 510 may be executed by processor 502 to determine a first maximum number of concurrent installations and a second maximum number of concurrent installations to be performed on the first host computing system and second host computing system, respectively, based on the corresponding load information and the resource capability. Instructions 512 may be executed by processor 502 to configure a first channel with the first maximum number of concurrent installations and a second channel with the second maximum number of concurrent installations. Further, machine-readable storage medium 504 may store instructions 514 to perform installation of agents on each of the first host computing system and the second host computing system based on the corresponding configured first channel and second channel, respectively. Instructions to perform the installation of the agents on each of the first host computing system and the second host computing system may include instructions to perform the installation of the agents to execute in the virtual machines running on each of the first host computing system and the second host computing system. Further, machine-readable storage medium 504 may store instructions to manage the installation of the agents on each of the first host computing system and the second host computing system by throttling agent installation requests based on the first maximum number of concurrent installations and the second maximum number of concurrent installations.

In one example, instructions to perform the installation of the agents to execute in the virtual machines may include instructions to create a number of threads corresponding to a total number of concurrent installations that can be performed in the data center and enable the threads to perform the installation of the agents on the first group of virtual machines and the second group of virtual machines in parallel based on the first maximum number of concurrent installations and the second maximum number of concurrent installations, respectively. In this example, one thread may install an agent on one virtual machine at a time. A sum of the first maximum number of concurrent installations and the second maximum number of concurrent installations may be less than or equal to a total number of concurrent installations that can be performed in the data center.

In the above example, instructions to enable the threads to perform the installation of the agents on the first group of virtual machines and the second group of virtual machines in parallel may include instructions to:
 enable the threads to perform the installation of the agents on a first set of the virtual machines in the first group in parallel based on the first maximum number of concurrent installations, the first set corresponds to the first maximum number of concurrent installations associated with the first channel,
 enable the threads to perform the installation of the agents on a second set of the virtual machines in the second group in parallel based on the second maximum number of concurrent installations, the second set corresponds to the second maximum number of concurrent installations associated with the second channel, and
 repeat the step of performing the installation for a next set of the virtual machines on the first host computing system and the second host computing system until the agent are installed on all the virtual machines running on the first host computing system and the second host computing system.

In another example, instructions to perform the installation of the agents on the first host computing system and the second host computing system based on the configured first channel and second channel comprises may include instructions to create a number of threads corresponding to a total number of concurrent installations that can be performed in the data center, and enable the threads to perform the installation of the agents on the first host computing system and the second host computing system in parallel based on the first maximum number of concurrent installations and the second maximum number of concurrent installations, respectively. A sum of the first maximum number of concurrent installations and the second maximum number of concurrent installations is less than or equal to the total number of concurrent installations that can be performed in the data center.

In the above example, instructions to perform the installation of the agents on the first host computing system and the second host computing system may include instructions to:
 enable the threads to perform the installation of a first set of agents on the first host computing system in parallel based on the first maximum number of concurrent installations, the first set corresponds to the first maximum number of concurrent installations associated with the first channel,
 enable the threads to perform the installation of a second set of agents on the second host computing system in parallel based on the second maximum number of concurrent installations, the second set corresponds to the second maximum number of concurrent installations associated with the second channel, and
 repeat the step of performing the installation for a next set of agents until installation of the agents on the first host computing system and the second host computing system is completed.

Furthermore, machine-readable storage medium 504 may store instructions to real-time monitor the load information associated with the first host computing system and the second host computing system and dynamically throttle the first maximum number of concurrent installations and the second maximum number of concurrent installations based on the real-time monitored load information.

Some or all of the system components and/or data structures may also be stored as contents (e.g., as executable or other machine-readable software instructions or structured data) on a non-transitory computer-readable medium (e.g., as a hard disk; a computer memory; a computer network or cellular wireless network or other data transmission medium; or a portable media article to be read by an appropriate drive or via an appropriate connection, such as a DVD or flash memory device) so as to enable or configure the computer-readable medium and/or one or more host computing systems or devices to execute or otherwise use or provide the contents to perform at least some of the described techniques.

It may be noted that the above-described examples of the present solution are for the purpose of illustration only. Although the solution has been described in conjunction with a specific embodiment thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract and drawings), and/or all of the steps of any method or process so disclosed, may be combined in any combination, except combinations where at least some of such features and/or steps are mutually exclusive.

The terms "include," "have," and variations thereof, as used herein, have the same meaning as the term "comprise" or appropriate variation thereof. Furthermore, the term "based on", as used herein, means "based at least in part on." Thus, a feature that is described as based on some stimulus can be based on the stimulus or a combination of stimuli including the stimulus.

The present description has been shown and described with reference to the foregoing examples. It is understood, however, that other forms, details, and examples can be made without departing from the spirit and scope of the present subject matter that is defined in the following claims.

What is claimed is:
1. A method comprising:
 determining load information associated with a host computing system in a data center;
 determining resource capability of the host computing system;

determining a maximum number of concurrent installations to be performed on the host computing system based on the load information and the resource capability;

configuring a channel with the maximum number of concurrent installations for the host computing system; and performing installation of agents on the host computing system based on the configured channel.

2. The method of claim 1, wherein the resource capability is selected from a group consisting of a processing resource capability, memory resource capability, storage resource capability, and networking resource capability.

3. The method of claim 1, wherein determining the load information associated with the host computing system comprises:

retrieving virtual machine details from a virtual machine inventory list of the data center;

grouping virtual machines based on host computing systems that executes the virtual machines such that each group of virtual machines corresponds to one host computing system; and determining the load information associated with the host computing system based on the grouping of the virtual machines.

4. The method of claim 3, wherein performing the installation of the agents on the host computing system comprises:

performing the installation of the agents to execute in the virtual machines running on the host computing system.

5. The method of claim 4, wherein performing the installation of the agents to execute in the virtual machines comprises:

creating a number of threads corresponding to a total number of concurrent installations that can be performed in the data center, wherein each thread is to install an agent on one virtual machine at a time; and enabling the threads to perform the installation of the agents on the virtual machines in parallel based on the maximum number of concurrent installations for the host computing system.

6. The method of claim 5, wherein enabling the threads to perform the installation of the agents on the virtual machines in parallel comprises:

enabling the threads to perform the installation of the agents on a first set of the virtual machines in parallel based on the maximum number of concurrent installations, the first set corresponds to the maximum number of concurrent installations associated with the channel; and repeating the step of performing the installation for a next set of the virtual machines on the host computing system until the agent is installed on all the virtual machines miming on the host computing system.

7. The method of claim 1, wherein performing the installation of the agents on the host computing system based on the configured channel comprises:

creating a number of threads corresponding to a total number of concurrent installations that can be performed in the data center, wherein each thread is to install an agent on the host computing system; and enabling the threads to perform the installation of the agents on the host computing system in parallel based on the maximum number of concurrent installations for the host computing system, wherein each of the agents is to perform a different function.

8. The method of claim 7, wherein enabling the threads to perform the installation of the agents on the host computing system comprises:

enabling the threads to perform the installation of a first set of agents on the host computing system in parallel based on the maximum number of concurrent installations, the first set corresponds to the maximum number of concurrent installations associated with the channel; and repeating the step of performing the installation for a next set of agents until installation of the agents on the host computing system is completed.

9. The method of claim 1, further comprising:

managing the installation of the agents on the host computing system by throttling agent installation requests based on the maximum number of concurrent installations.

10. The method of claim 1, further comprising:

real-time monitoring the load information associated with the host computing system; and dynamically throttling the maximum number of concurrent installations based on the real-time monitored load information.

11. A system comprising:

a plurality of host computing systems in a data center, each host computing system executing workloads running therein; and a management node communicatively coupled to the host computing systems to manage installation of agents in the host computing systems, wherein the management node comprises a processor and memory coupled to the processor, and wherein the memory comprises:

an agent installation planner to:

determine a maximum number of concurrent installations to be performed on each host computing system based on resource capability of each host computing system and a number of workloads running on each host computing system; and configure a channel for each host computing system and setting the maximum number of concurrent installations to be performed corresponding to each channel; and an agent installer manager to perform installation of agents on the workloads based on the configured channel associated with each host computing system.

12. The system of claim 11, wherein the workloads comprise virtual machines, containers, or a combination thereof.

13. The system of claim 11, wherein the agent installation planner is to:

retrieve workload details from an inventory list of the data center;

group the workloads based on host computing systems that executes the workloads such that each group of workloads corresponds to one host computing system; and determine the number of workloads running on each of the host computing systems based on the grouping of the workloads.

14. The system of claim 11, wherein the management node comprises a throttled multi-channel executor to:

dynamically create threads in the data center with a thread count equal to a total number of concurrent installations that can be performed in the data center, each thread is to perform installation of an agent on one workload at a time; and enable the created threads to perform the installation of the agents in each channel based on the maximum number of concurrent installations to be performed corresponding to each channel, wherein a sum of the maximum number of concurrent installations associated with the plurality of host computing systems is less than or equal to the total number of concurrent installations.

15. The system of claim 14, wherein the agent installer manager is to:
repeat the step of performing the installation of the agents on the workloads based on the maximum number of concurrent installations until the agents are installed on all the workloads in the data center, wherein the threads are to concurrently perform the installation of the agents on the workloads such that the number of concurrent installations in a particular channel does not exceed the maximum number of concurrent installations of that channel; and
track the installation of the agents on the workloads running on the plurality of host computing systems.

16. The system of claim 14, wherein the throttled multi-channel executor is to:
manage the installation of the agents on the workloads by throttling agent installation requests based on the maximum number of concurrent installations of each host computing system and the total number of concurrent installations.

17. The system of claim 11, wherein the management node comprises a dynamic throttling controller to:
real-time monitor workload information associated with each of the host computing systems; and
dynamically throttle the maximum number of concurrent installations based on the real-time monitored workload information and the total number of concurrent installations.

18. A non-transitory machine-readable storage medium encoded with instructions that, when executed by a processor of a computing system, cause the processor to:
determine load information associated with a first host computing system and a second host computing system in a data center;
determine resource capability of the first host computing system and the second host computing system;
determine a first maximum number of concurrent installations and a second maximum number of concurrent installations to be performed on the first host computing system and second host computing system, respectively, based on the corresponding load information and the resource capability;
configure a first channel with the first maximum number of concurrent installations and a second channel with the second maximum number of concurrent installations; and
perform installation of agents on each of the first host computing system and the second host computing system based on the configured first channel and second channel, respectively.

19. The non-transitory machine-readable storage medium of claim 18, wherein instructions to determine the load information comprises instructions to:
retrieve virtual machine details from a virtual machine inventory list of the data center;
group virtual machines in the retrieved virtual machine details based on the first host computing system and the second host computing system that executes the virtual machines such that a first group of virtual machines corresponds to the first host computing system and a second group of virtual machines corresponds to second host computing system; and
determine the load information associated with the first host computing system and second host computing system based on the grouping of the virtual machines.

20. The non-transitory machine-readable storage medium of claim 19, wherein instructions to perform the installation of the agents on the first host computing system and the second host computing system comprises instructions to:
perform the installation of the agents to execute in the virtual machines running on the first host computing system and the second host computing system.

21. The non-transitory machine-readable storage medium of claim 20, wherein instructions to perform the installation of the agents to execute in the virtual machines comprises instructions to:
create a number of threads corresponding to a total number of concurrent installations that can be performed in the data center, wherein each thread is to install an agent on one virtual machine at a time; and
enable the threads to perform the installation of the agents on the first group of virtual machines and the second group of virtual machines in parallel based on the first maximum number of concurrent installations and the second maximum number of concurrent installations, respectively, wherein a sum of the first maximum number of concurrent installations and the second maximum number of concurrent installations is less than or equal to the total number of concurrent installations that can be performed in the data center.

22. The non-transitory machine-readable storage medium of claim 21, wherein instructions to enable the threads to perform the installation of the agents on the first group of virtual machines and the second group of virtual machines in parallel comprises instructions to:
enable the threads to perform the installation of the agents on a first set of the virtual machines in the first group in parallel based on the first maximum number of concurrent installations, the first set corresponds to the first maximum number of concurrent installations associated with the first channel;
enable the threads to perform the installation of the agents on a second set of the virtual machines in the second group in parallel based on the second maximum number of concurrent installations, the second set corresponds to the second maximum number of concurrent installations associated with the second channel; and
repeat the step of performing the installation for a next set of the virtual machines on the first host computing system and the second host computing system until the agents are installed on all the virtual machines running on the first host computing system and the second host computing system.

23. The non-transitory machine-readable storage medium of claim 18, wherein instructions to perform the installation of the agents on the first host computing system and the second host computing system based on the configured first channel and second channel comprises instructions to:
create a number of threads corresponding to a total number of concurrent installations that can be performed in the data center, wherein each thread is to install an agent on the first host computing system or the second host computing system; and
enable the threads to perform the installation of the agents on each of the first host computing system and the second host computing system in parallel based on the first maximum number of concurrent installations and the second maximum number of concurrent installations, respectively, wherein a sum of the first maximum number of concurrent installations and the second maximum number of concurrent installations is less than or equal to the total number of concurrent installations that can be performed in the data center, and wherein each of the agents is to perform a different function.

24. The non-transitory machine-readable storage medium of claim 23, wherein instructions to enable the threads to perform the installation of the agents on the first host computing system and the second host computing system comprises institutions to:
  enable the threads to perform the installation of a first set of agents on the first host computing system in parallel based on the first maximum number of concurrent installations, the first set corresponds to the first maximum number of concurrent installations associated with the first channel;
  enable the threads to perform the installation of a second set of agents on the second host computing system in parallel based on the second maximum number of concurrent installations, the second set corresponds to the second maximum number of concurrent installations associated with the second channel; and
  repeat the step of performing the installation for a next set of agents until installation of the agents on the first host computing system and the second host computing system is completed.

25. The non-transitory machine-readable storage medium of claim 18, further comprising instructions that, when executed by the processor, cause the processor to:
  manage the installation of the agents on the first host computing system and the second host computing system by throttling agent installation requests based on the first maximum number of concurrent installations and the second maximum number of concurrent installations.

26. The non-transitory machine-readable storage medium of claim 18, further comprising instructions that, when executed by the processor, cause the processor to:
  real-time monitor the load information associated with the first host computing system and the second host computing system; and
  dynamically throttle the first maximum number of concurrent installations and the second maximum number of concurrent installations based on the real-time monitored load information.

* * * * *